US008381769B2

(12) United States Patent
Hsieh

(10) Patent No.: US 8,381,769 B2
(45) Date of Patent: Feb. 26, 2013

(54) FLOW CONTROLLER

(75) Inventor: Pai-Chou Hsieh, Chang-Hua County (TW)

(73) Assignee: Yuan Pin Industrial Co., Ltd., Ho-Mei Township, Chang-Hua County (TW)

( * ) Notice: Subject to any disclaimer, the term of this patent is extended or adjusted under 35 U.S.C. 154(b) by 374 days.

(21) Appl. No.: 12/798,147

(22) Filed: Mar. 29, 2010

(65) Prior Publication Data

US 2011/0233310 A1 Sep. 29, 2011

(51) Int. Cl.
*B05B 7/02* (2006.01)
*E03B 1/02* (2006.01)
*F16K 31/60* (2006.01)

(52) U.S. Cl. .................................. 137/614.19; 239/526

(58) Field of Classification Search .................. 137/613, 137/614.19; 251/309, 209, 231, 244, 245; 239/526

See application file for complete search history.

(56) References Cited

U.S. PATENT DOCUMENTS

| | | | | |
|---|---|---|---|---|
| 2,457,526 | A * | 12/1948 | Brown | 239/574 |
| 4,537,219 | A * | 8/1985 | Milish | 137/614.19 |
| 5,887,796 | A * | 3/1999 | Dimmer | 239/444 |
| 6,761,324 | B2 * | 7/2004 | Chang | 239/526 |
| 7,429,029 | B2 * | 9/2008 | Wang | 251/309 |
| 2004/0222320 | A1 * | 11/2004 | Wu | 239/526 |
| 2007/0138321 | A1 * | 6/2007 | Wang et al. | 239/441 |

* cited by examiner

*Primary Examiner* — John Rivell
*Assistant Examiner* — Angelisa Hicks
(74) *Attorney, Agent, or Firm* — Charles E. Baxley

(57) ABSTRACT

A flow controller includes a handle, first and second valves, and first and second levers. The handle includes an inlet, an outlet, a first chamber in communication with the inlet and outlet and a second chamber in communication with the outlet. A first end of the first valve is movable in the first chamber between a shutting position for shutting the inlet and an opening position for opening the inlet. A second end of the first valve is outside the first chamber. The first lever is operable to move the first valve to the opening position. The second valve is rotationally located in the second chamber for controlling the flow rate of water going through the outlet. The second lever is operable to rotate the second valve.

11 Claims, 5 Drawing Sheets

FLOW CONTROLLER

BACKGROUND OF INVENTION

1. Field of Invention

The present invention relates to a sprinkler and, more particularly, to a flow controller for use in a sprinkler.

2. Related Prior Art

Sprinklers are commonly used in gardening. A conventional sprinkler includes a lever. The lever is operable to control the flow rate of water sprinkled from the conventional sprinkler. Different types of plants in different phases of growth require different amounts of water. A user exerts various forces on the lever to cause the conventional sprinkler to sprinkle water onto the plants at different flow rates. It is however difficult to control the flow rates precisely. Moreover, a professional nursery garden is generally large. The user has to exert the forces on the lever for a long time, and this is exhausting and could entail sore palms and wrists of the user.

To solve the foregoing problems, there have been devised sprinklers with ratchet-based mechanisms to retain the sprinklers at various flow rates for a long time. However, it is technically difficult to provide a sprinkler with a ratchet-based mechanism since a sprinkler is small. Moreover, some of the ratchet-based mechanisms cannot be rotated in two directions. Hence, a user often has to rotate the ratchet-based mechanism for almost 360 degrees in a direction to switch the sprinkler from one flow rate to another although he or she might only have to rotate the ratchet-based mechanism for only several degrees in an opposite direction. This causes inconvenience and wastes a lot of water.

The present invention is therefore intended to obviate or at least alleviate the problems encountered in prior art.

SUMMARY OF INVENTION

It is the primary objective of the present invention to provide a sprinkler with a conveniently operable flow controller.

To achieve the foregoing objective, the flow controller includes a handle, first and second valves, and first and second levers. The handle includes an inlet, an outlet, a first chamber in communication with the inlet and outlet and a second chamber in communication with the outlet. A first end of the first valve is movable in the first chamber between a shutting position for shutting the inlet and an opening position for opening the inlet. A second end of the first valve is outside the first chamber. The first lever is pivotally connected to the handle and located against the second end of the first valve. The first lever is operable to move the first valve to the opening position. The second valve is rotationally located in the second chamber for controlling the flow rate of water going through the outlet. The second lever is connected to the second valve. The second lever is operable to rotate the second valve.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
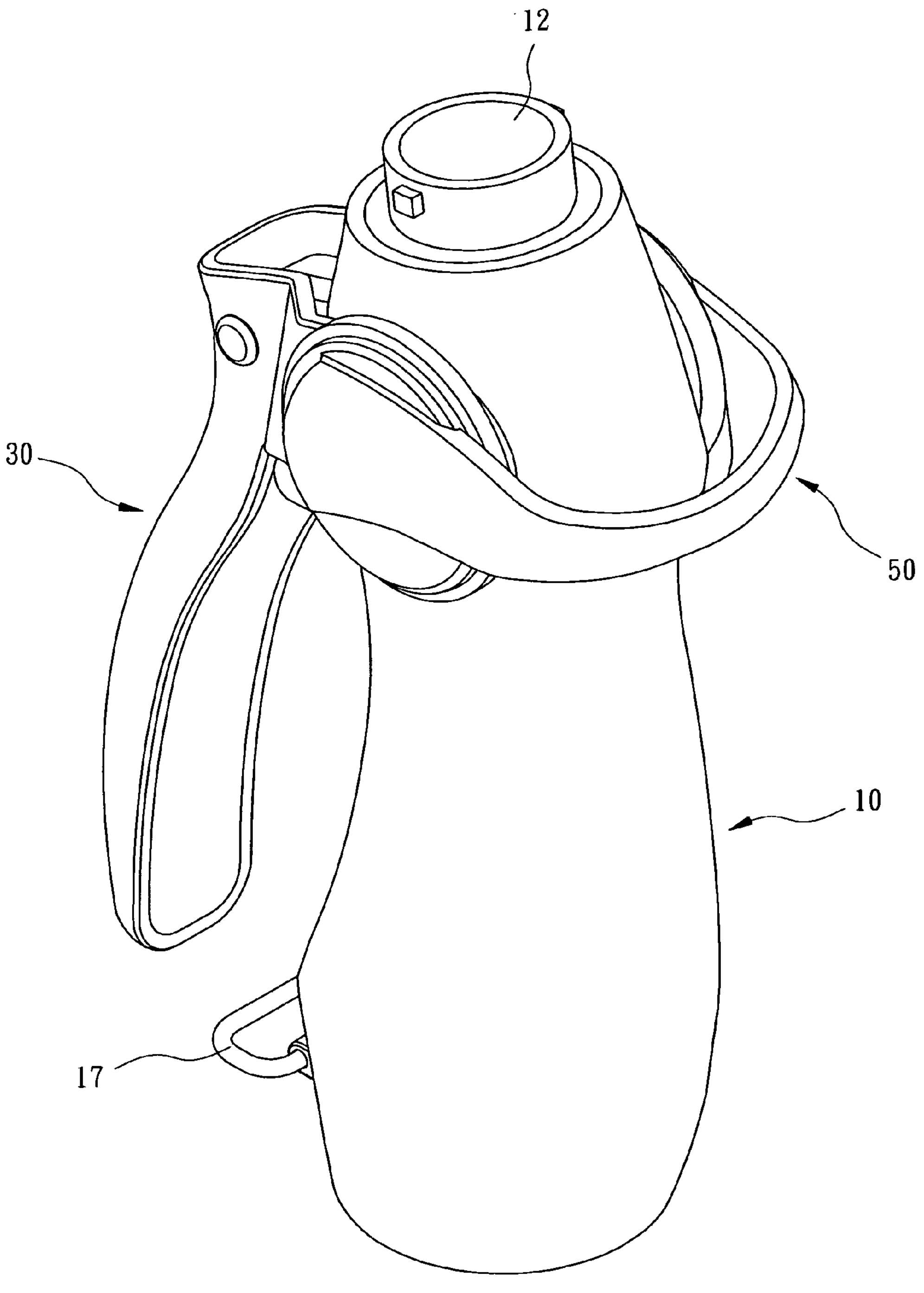
FIG. 1 is a perspective view of a flow controller according to the preferred embodiment of the present invention.
Figure 2:
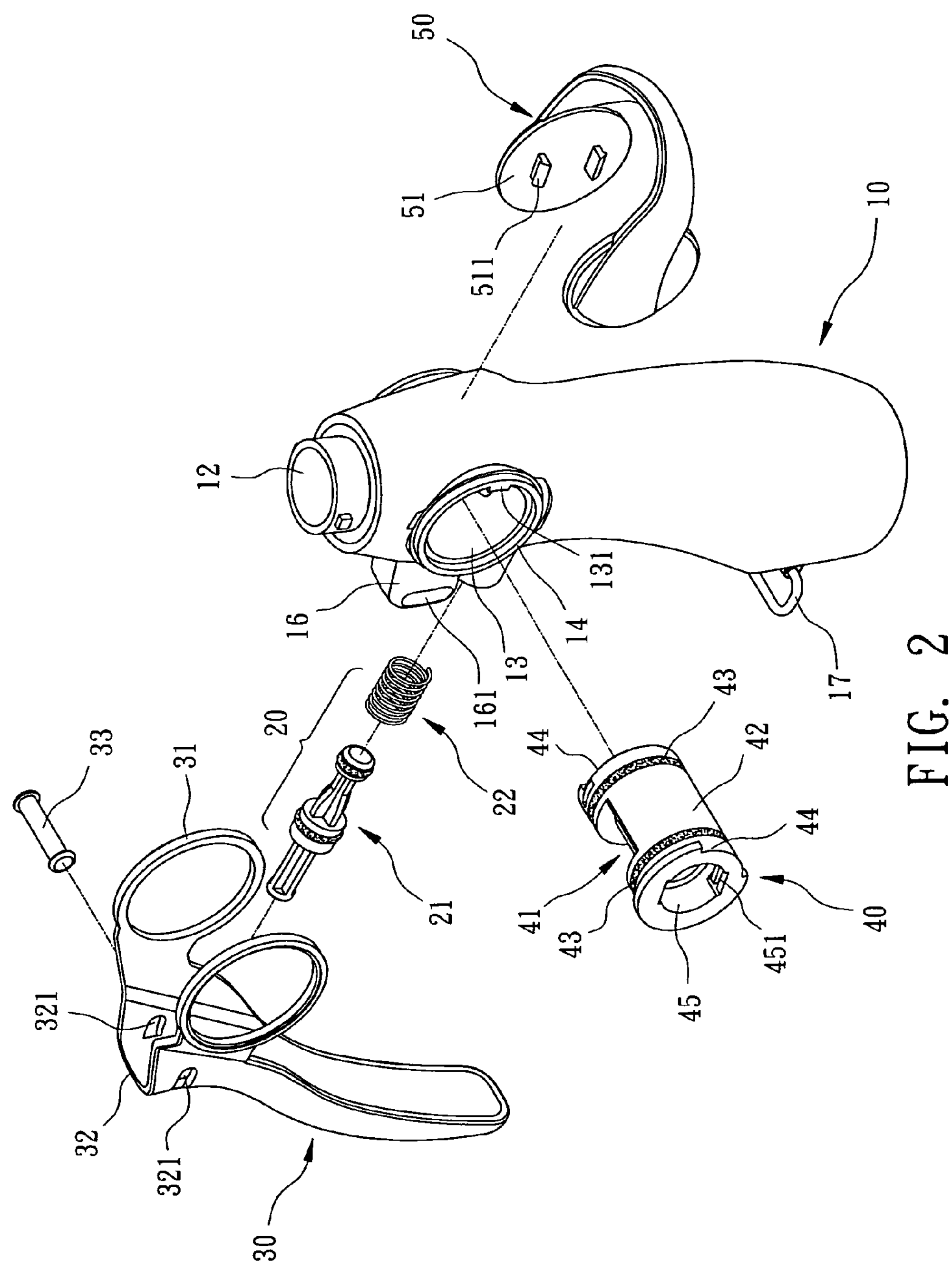
FIG. 2 is an exploded view of the flow controller shown in FIG. 1.
Figure 3:
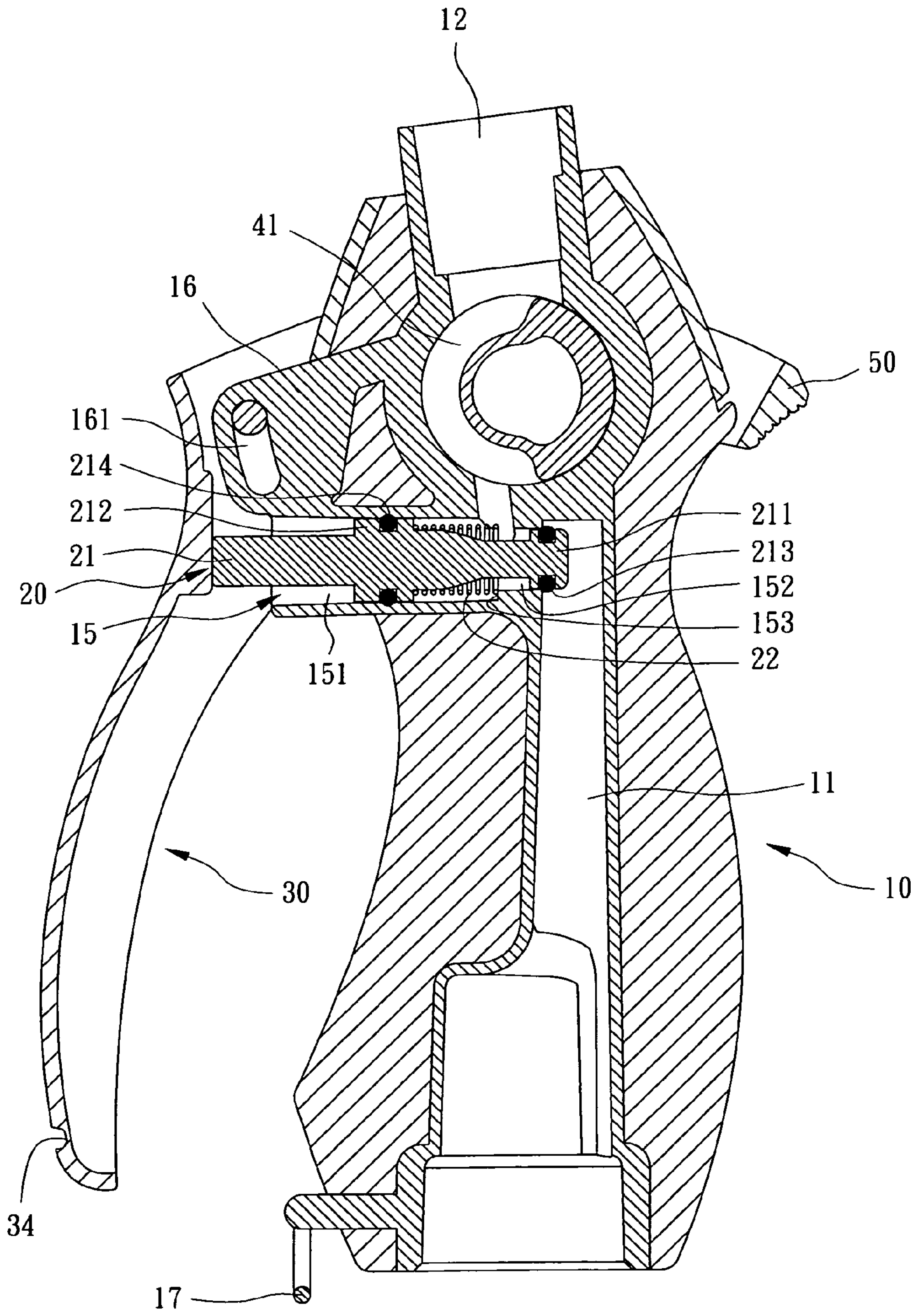
FIG. 3 is a cross-sectional view of the flow controller shown in FIG. 1.

Referring to FIGS. 1 to 3, a flow controller includes a handle 10, a first valve unit 20, a first lever 30, a second valve unit and a second lever 50 according to the preferred embodiment of the present invention. The handle 10 includes an inlet 11 defined therein, an outlet 12 defined therein, a first chamber 15 in communication with the inlet 11 and the outlet 12, and a second chamber 13 in communication with the outlet 12. The first chamber 15 includes a large section 151 and a small section 152. The cross-sectional area of the large section 151 of the first chamber 15 is smaller than that of the small section 152. A shoulder 153 is formed between the sections 151 and 152 of the first chamber 15. The large section 151 of the first chamber 15 leads to the exterior of the handle 10. The small section 152 of the first chamber 15 leads to the inlet 11 and the outlet 12.

Two stops 131 are formed on opposite sides of the handle 10, respectively. Each of the stops 131 is located near a related one of two open ends of the second chamber 13. Two annular ridges 14 are formed on opposite sides of the handle 10, respectively. Each of the annular ridges 14 extends around a related one of the open ends of the second chamber 13. A lug 16 is formed on a front face of the handle 10, near an end of the handle 10. A slot 161 is defined in the lug 16. A ring 17 is pivotally connected to the handle 10, near an opposite end of the handle 10. A section of the ring 17 is rotationally located in an aperture defined in a lug extending from the handle 10.

The first valve unit 20 includes a first valve 21 and a spring 22. The first valve 21 is in the form of a rod movably inserted in the first chamber 15. The first valve 21 includes a piston-like portion 211 formed at a first end and another piston-like portion 212 formed on a middle section. A sealing ring 213 is located in a groove defined in and around the periphery of the piston-like portion 211. Another sealing ring 214 is located in a groove defined in and around the periphery of the piston-like portion 212 of the first valve 21. The spring 22 is a compression spring.

The first lever 30 is made of a plastic strip for example. The first lever 30 includes two rings 31 formed on a side near an upper end and a mask-like portion 32 formed thereon at the upper end. Two apertures 321 are defined in the mask-like portion 32 of the first lever 30. The first lever 30 further includes a recess 34 defined in an opposite side near a lower end.

The second valve unit includes a second valve 40 and two sealing rings 43. The second valve 40 is in the shape of a drum. The second valve 40 includes an arched recess 41 defined in the periphery and a semi-cylindrical face 42 formed on the periphery. The recess 41 extends for about 180 degrees and the semi-cylindrical face 42 therefore extends for about 180 degrees. The second valve 40 further includes a tunnel 45 axially defined therein and four recesses 451 defined in the wall of the tunnel 45. Two of the recesses 451 are located near an end of the second valve 40 while the other recesses 451 are located near an opposite end of the second valve 40. Two arched cutouts 44 are defined in the periphery of the second valve 40. Each of the arched cutouts 44 is located near a related one of the ends of the second valve 40. Each of the sealing rings 43 is located in a groove defined in and around the periphery of the second valve 40.

The second lever 50 is substantially a U-shaped element, with two opposite discs 51 formed at two ends thereof. Two hooks 511 extend from each of the discs 51.

In assembly, the spring 22 is provided on and around the first valve 21 before the first valve 21 is movably located in the first chamber 15 defined in the handle 10. The piston-like portion 211 of the first valve 21 is located in and seals the small section 152 of the first chamber 15. The piston-like portion 212 is located in and seals the large section 151 of the first chamber 15. The spring 22 is compressed between the piston-like portion 212 of the first valve 21 and the shoulder 153 of the first chamber 15. An opposite second end of the first valve 21 is located outside the first chamber 15.

The rings 31 of the first lever 30 are provided on and around the annular ridges 14 formed on the handle 10. Thus, the first lever 30 is pivotally connected to the handle 10. The mask-like portion 32 of the first lever 30 covers the lug 16 of the handle 10. A pin 33 is inserted in the slot 161 of the lug 16 through the apertures 321 of the first lever 30. Thus, the first lever 30 is retained on the handle 10. The first lever 30 is in contact with the second end of the first valve 21.

The second valve 40 is rotationally located in the second chamber 13 defined in the handle 10. The sealing rings 43 are in contact with the wall of the second chamber 13 and seal the second chamber 13. The arched cutouts 44 receive the stops 131 so that the rotation of the second valve 40 in the second chamber 13 is confined in a predetermined range. The recess 41 is in communication with the outlet 12.

The hooks 511 of the second lever 50 are located in the recesses 451 of the second valve 40. Thus, the second lever 50 is connected to the second valve 40. The second lever 50 is operable to rotate the second valve 40. Moreover, the discs 51 of the second lever 50 keep the second valve 40 in the second chamber 13 of the handle 10.

In use, a nozzle is connected to outlet 12 of the handle 10 although not shown. Thus, the flow controller controls the flow rate of water to be sprinkled from the nozzle.

Referring to FIG. 3, the piston-like portion 211 of the first valve 21 and the sealing ring 213 shut the small section 152 of the first chamber 15. That is, the piston-like portion 211 of the first valve 21 and the sealing ring 213 shut the inlet 11 from the outlet 12. Thus, water cannot travel through the flow controller. The spring 22 tends to retain the first valve 21 in this position to close the inlet 11.

Figure 4:
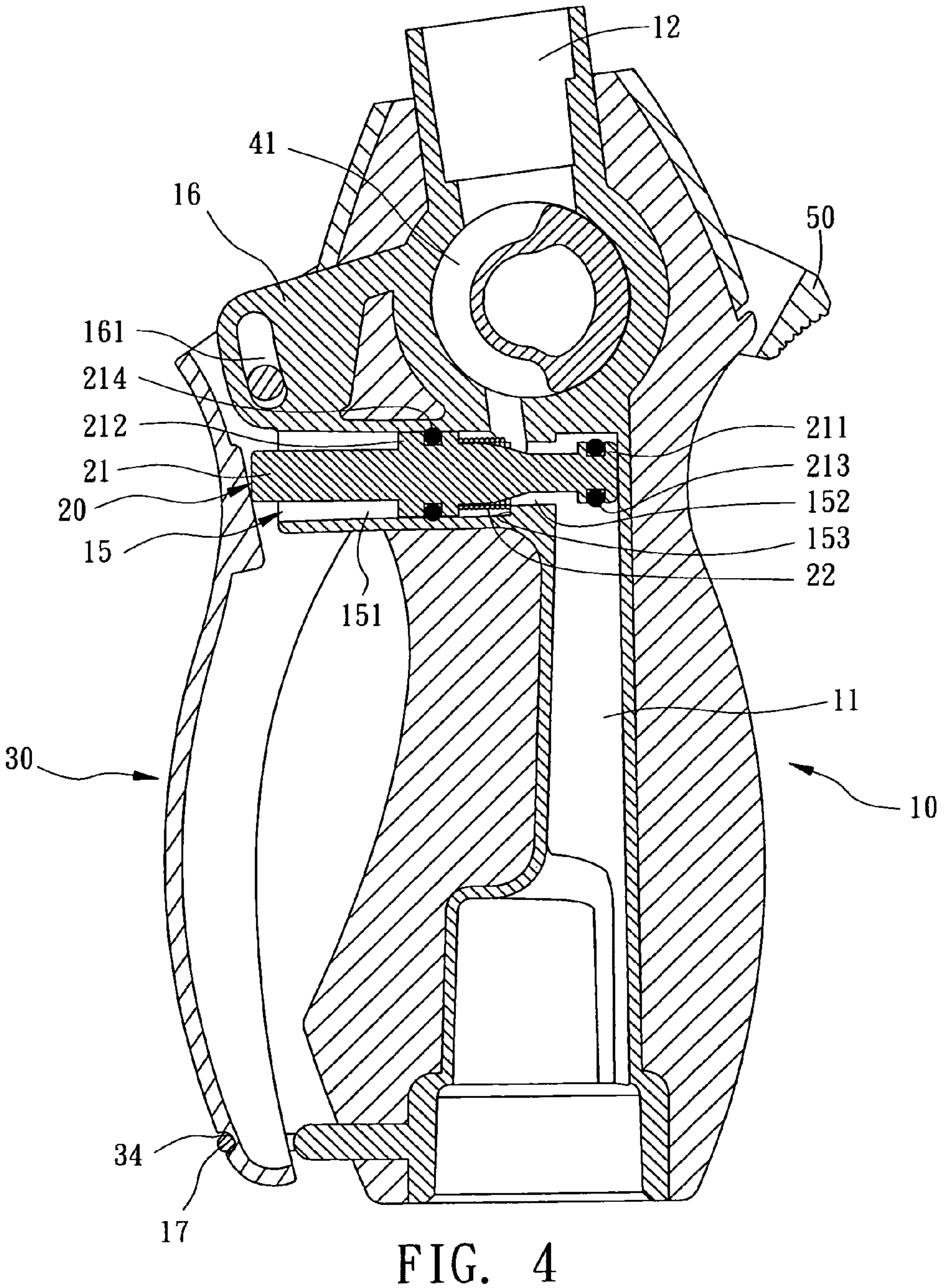
FIG. 4 is a cross-sectional view of the flow controller in another position than shown in FIG. 3.

Referring to FIG. 4, the first lever 30 is pressed so that the first valve 21 is moved further into the first chamber 15 against the spring 22. The piston-like portion 211 of the first valve 21 and the sealing ring 213 are moved out of the small section 152 of the first chamber 15. That is, the inlet 11 is in communication with the outlet 12. Thus, water can travel through the flow controller. The ring 17 is located in the recess 34 so that the first lever 30 is retained in the pressed position. That is, the inlet 11 is retained in communication with the outlet 12 to allow the water to go through the flow controller.

Figure 5:
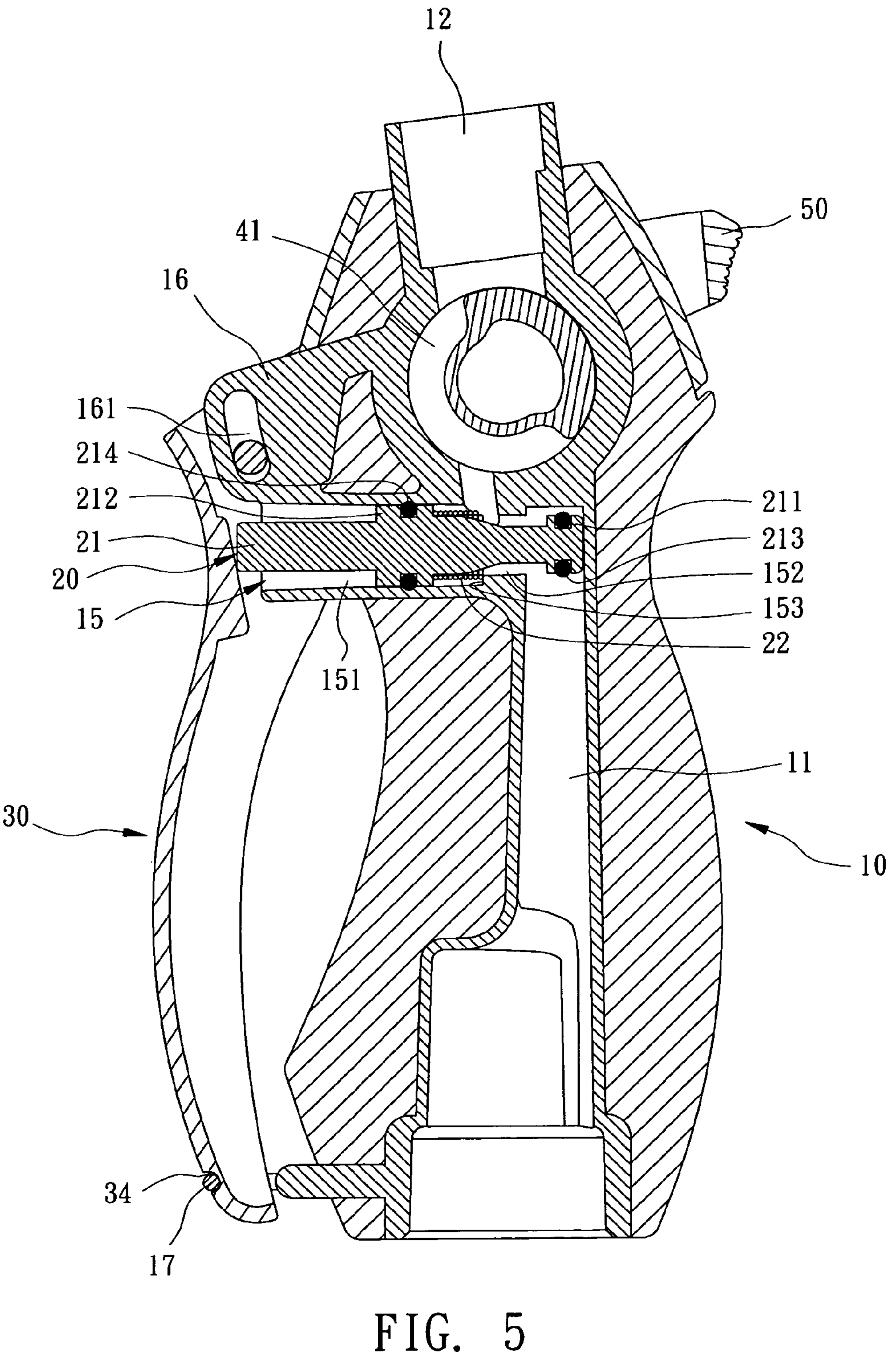
FIG. 5 is a cross-sectional view of the flow controller shown in FIG. 4.

Referring to FIG. 5, the second lever 50 is operable to rotate the second valve 40 in the second chamber 13 of the handle 10. Thus, the degree of the communication of the arched recess 41 of the second valve 40 with outlet 12 of the handle 10 is adjustable. That is, the flow rate of the water going through the flow controller is under control. The rotation of the second valve 40 is confined in a predetermined range by the stops 131 located in the arched cutouts 44.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A flow controller comprising:

a handle including an inlet and outlet defined therein, a first chamber in communication with both of the inlet and outlet, and a second chamber in communication with the outlet;

a first valve including a first end located in the first chamber and a second end located outside the first chamber, wherein the first end of the first valve is movable between a shutting position for shutting the inlet and an opening position for opening the inlet;

a first lever pivotally connected to the handle and located against the second end of the first valve so that the first lever is operable to move the first valve to the opening position;

a second valve rotationally located in the second chamber for controlling the flow rate of water going through the outlet; and a second lever connected to the second valve so that the second lever is operable to rotate the second valve;

wherein the handle includes two stops formed on two opposite sides respectively, wherein each of the stops is located near an open end of the second chamber, wherein the second valve includes two arched cutouts in and along which the stops are moved when the second valve is rotated in the second chamber.

2. The flow controller according to claim 1, wherein the first valve includes:

a first piston-like portion formed at the first end and movable between the shutting and opening positions; and a second piston-like portion formed thereon for sealing the first chamber.

3. The flow controller according to claim 2 further including a spring compressed between the second piston-like portion of the first valve and a portion of the handle to bias the first valve to the opening position.

4. The flow controller according to claim 3, wherein the first chamber includes a small section, a large section in communication with the small section, and a shoulder formed between the small and large sections, wherein the first piston-like portion is movable in the small section of the first chamber , wherein the second piston-like portion is movable in the large section of the first chamber, wherein the spring is compressed between the shoulder and the second piston-like portion.

5. A flow controller comprising:

a handle including an inlet and outlet defined therein, a first chamber in communication with both of the inlet and outlet, and a second chamber in communication with the outlet;

a first valve including a first end located in the first chamber and a second end located outside the first chamber, wherein the first end of the first valve is movable between a shutting position for shutting the inlet and an opening position for opening the inlet;

a first lever pivotally connected to the handle and located against the second end of the first valve so that the first lever is operable to move the first valve to the opening position;

a second valve rotationally located in the second chamber for controlling the flow rate of water going through the outlet; and a second lever connected to the second valve so that the second lever is operable to rotate the second valve;

wherein the handle includes two annular ridges each extending around a related one of two open ends of the second chamber, wherein the first lever includes two rings provided on and around the annular ridges so that the first lever is pivotally connected to the handle.

6. The flow controller according to claim 5, further including a pin driven in the first lever and the handle so that the first lever is retained on the handle.

7. The flow controller according to claim 6, wherein the handle includes a lug formed thereon, wherein the first lever includes a mask-like portion provided on the lug, and wherein the pin is driven in the lug through the mask-like portion of the first lever.

8. The flow controller according to claim 5, wherein the second valve includes:

an arched recess defined therein to selectively communicate the outlet with the first chamber; and a semi-cylindrical face formed thereon to contact a wall of the second chamber to change the degree of opening of the outlet.

9. The flow controller according to claim 8, further including two sealing rings provided on the second valve to seal the second chamber.

10. A flow controller comprising:

a handle including an inlet and outlet defined therein, a first chamber in communication with both of the inlet and outlet, and a second chamber in communication with the outlet;

a first valve including a first end located in the first chamber and a second end located outside the first chamber, wherein the first end of the first valve is movable between a shutting position for shutting the inlet and an opening position for opening the inlet;

a first lever pivotally connected to the handle and located against the second end of the first valve so that the first lever is operable to move the first valve to the opening position;

a second valve rotationally located in the second chamber for controlling the flow rate of water going through the outlet; and a second lever connected to the second valve so that the second lever is operable to rotate the second valve;

wherein the second valve includes two recesses at each end, wherein the second lever includes two discs each formed with two hooks inserted in the recesses.

11. The flow controller according to claim 10 further including a ring pivotally connected to the handle, wherein the first lever includes a recess for receiving the ring to keep the first lever pressed.

* * * * *